United States Patent [19]

Ruyten et al.

[11] 4,353,226

[45] Oct. 12, 1982

[54] ADJUSTABLE TORSION-SPRING SLIPPING CLUTCH

[75] Inventors: Henricus M. Ruyten, Vienna, Austria; Johannes F. Hoefnagels, Eindhoven, Netherlands

[73] Assignee: U.S. Philips Corporation, New York, N.Y.

[21] Appl. No.: 135,942

[22] Filed: Mar. 31, 1980

[30] Foreign Application Priority Data

Apr. 2, 1979 [NL] Netherlands ............................ 792544

[51] Int. Cl.³ .............................................. F16D 7/02
[52] U.S. Cl. ...................................... 464/40; 192/56 C
[58] Field of Search .............................. 64/30 E, 30 R; 192/56 C, 41 S

[56] References Cited

U.S. PATENT DOCUMENTS 2,541,947  2/1951  Starkey ............................. 196/56 C
2,595,454  5/1952  Greenlee ............................. 64/30 E
3,335,835  8/1967  Conlon .............................. 192/56 C
4,258,556  3/1981  Ruyten et al. ....................... 64/30 E

FOREIGN PATENT DOCUMENTS 1187883  2/1965  Fed. Rep. of Germany ...... 64/30 E

Primary Examiner—P. S. Lall
Attorney, Agent, or Firm—David R. Treacy

[57] ABSTRACT

An adjustable torsion-spring slipping clutch, especially useful for tape recorders, having first and second coaxial clutch sections which are rotatable about an axis of rotation. The second clutch section includes a sleeve which has a substantially circular cylindrical shape and is adjustable in diameter. A coaxially arranged cylindrical helical torsion spring is connected to one end to the first clutch section and its turns are wrapped around the sleeve, adjustment of sleeve diameter determining the torque to be transmitted between the clutch sections.

9 Claims, 4 Drawing Figures

ADJUSTABLE TORSION-SPRING SLIPPING CLUTCH

BACKGROUND OF THE INVENTION

The invention relates to an adjustable torsion-spring slipping clutch, which in normal operation provides a constant torque drive from a faster rotating driving section to a drive section; and in particular to such a clutch useful for apparatus for recording and/or playing back signals on a magnetic tape, the clutch comprising first and second coaxially arranged clutch sections which are rotatable relative to each other about an axis of rotation, and a coaxially arranged cylindrical helical torsion spring which at one end is connected to the first clutch section, the second clutch section comprising a sleeve which is substantially circular in a cross-section perpendicular to the axis of rotation and around which turns of the spring are wrapped for transmitting torque between the clutch sections by the friction between the spring and the sleeve, which turns are adjustable in diameter for determining the torque to be transmitted between the clutch sections.

A clutch of this type is known from the published Austrian Patent Application A 8026/77, to which U.S. Pat. No. 4,258,556 corresponds. In this known clutch the sleeve of the second clutch section is conical, the spring being axially movable relative to the sleeve so as to enable the diameter of the spring turns to be adjusted. Depending on the apex angle of this cone some friction may occur between the turns of the spring under certain circumstances, which inter-turn friction may give rise to a certain inaccuracy in the operation.

SUMMARY OF THE INVENTION

The object of the invention is to construct such a clutch so that precise constant torque is transmitted under all circumstances. According to the invention the sleeve of the second clutch section has a substantially circular cylindrical shape and the diameter of the sleeve is adjustable. Because of the circular cylindrical shape of the sleeve all spring turns can continuously cooperate with the sleeve, each turn as far as possible contributing equally to the transmission of the torque. This optimum cooperation between each turn and the sleeve enables a constant accurately adjustable torque to be transmitted between the clutch sections over a long period. Thus, once it has been adjusted, the clutch in accordance with the invention will perform in a very reliable manner for a long period of time, without any further readjustment.

In a clutch in accordance with the invention it is advantageous if the sleeve, for adjusting its diameter, is rotationally adjustable to any of a plurality of positions relative to another part of the second clutch section. This provides a satisfactory adjustability in combination with a compact construction of the clutch. In a suitable embodiment of the clutch the sleeve is made of a material which for adjusting the sleeve diameter is elastically movable in a radial direction relative to the axis of rotation. In this way the sleeve diameter can be adjusted in a reliable and simple manner. It has been found that such an adjustment can be carried out in a suitable manner if the sleeve comprises a plurality of segments of similar shape, which are arcuate in a cross-section perpendicular to the axis of rotation and which are each movable in a radial direction relative to the axis of rotation. The segments enable the circular cylindrical shape of the sleeve to be maintained upon adjustment, so that an optimum cooperation between the turns and sleeve is obtained at various sleeve diameters.

According to another preferred embodiment the segments extend in an axial direction and at one end are connected to an annular support, which support is provided with adjusting means for the rotational adjustment of the sleeve relative to the other part of the second clutch section. In addition to a robust construction this provides a simple adjusting facility for the segments.

In the preferred embodiment incorporating the features just described, the sleeve is concentrically arranged around a hub of the second clutch section, which hub at its periphery has a plurality of convexly curved spiralling ramp surfaces of similar shape which cooperate with the sleeve. In a cross-section perpendicular to the axis of rotation extending along an arc, the distance of each ramp surface from the axis of rotation gradually increases in a circumferential direction. The ramp surfaces enable the diameter of the sleeve to be adjusted to a multitude of gradually increasing values. Preferably the number of segments of the sleeve is equal to the number of ramp surfaces of the hub, and the inner surface of each segment, in a cross-section perpendicular to the axis of rotation, has a concave arcuate shape which corresponds to the convex arcuate shape of the ramp surfaces. During adjustment an optimum cooperation of the segments with the ramp surfaces is thus maintained, which is important in order to maintain the cylindrical shape of the sleeve. In view of this adjustment it is found to be advantageous if each segment comprises an inwardly radially extending shoulder at that end of its arcuate inner surface which is furthest from the axis of rotation, the distance of the shoulder from the axis of rotation substantially corresponding to the distance from this axis of that end of the surface of the segment which is nearer the axis of rotation. During adjustment the shoulder assist in maintaining the cylindrical shape of the segments. In this connection it is advantageous that the ramp surfaces and the segments each extend over an arc of substantially 120°. The segments are then divided over the clutch circumference in an optimum manner, so as to obtain a wide range of sleeve diameter adjustment, while maintaining the cylindrical shape.

The invention is described in more detail on the basis of an embodiment shown in the drawing, but to which the invention is not limited.

DESCRIPTION OF THE PREFERRED EMBODIMENTS

Figure 1:
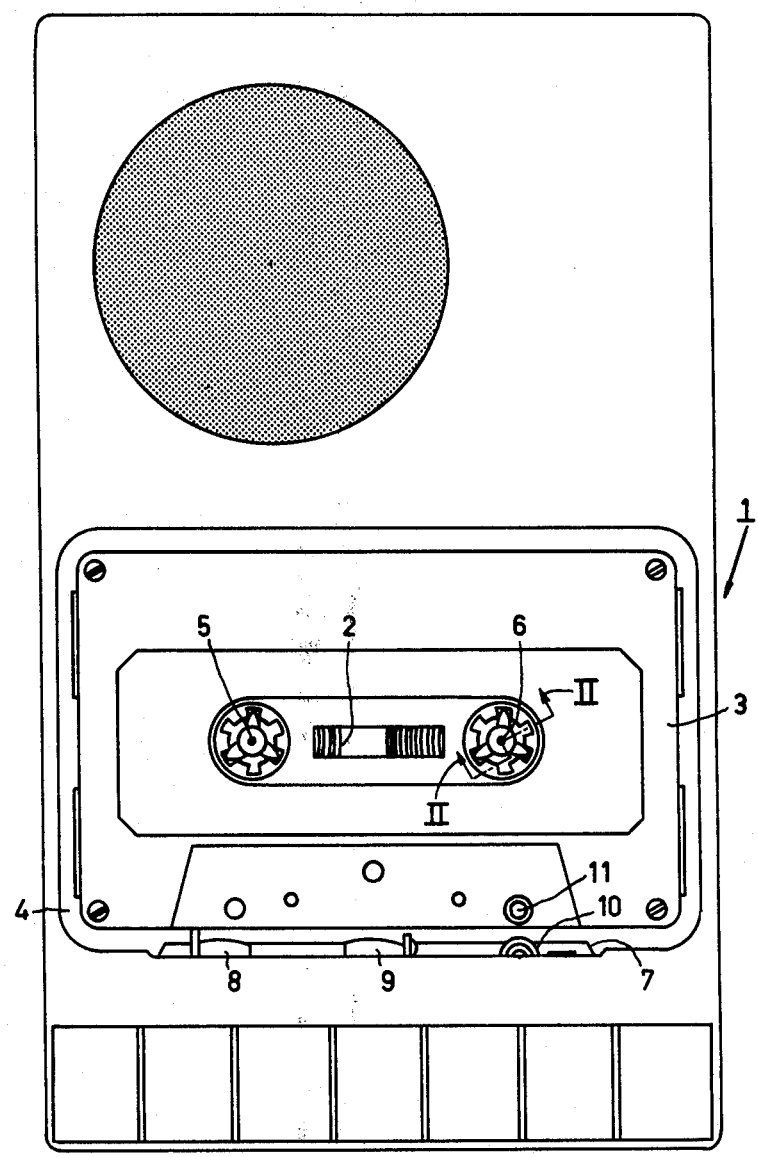
FIG. 1 is a plan view of an apparatus in which the invention is used.

The apparatus 1 shown in FIG. 1 is an apparatus by means of which signals can be recorded and/or played back on a magnetic tape 2, which is wound on two winding hubs in a substantially rectangular cassette 3 and which between the winding hubs passes along a long side of the cassette.

The apparatus comprises a chassis with a deck plate 4 at the top, an upper surface of said deck plate constituting a positioning surface for the cassette 3. When the cassette is placed on the positioning surface the winding hubs are coupled to the winding mandrils 5 and 6.

The apparatus furthermore comprises a head plate 7, near the long side of the cassette, which plate carries magnetic heads, which comprise an erase head 8 and a combined recording/playback head 9. Near the long side the cassette has a side wall formed with a plurality of openings which, by moving the head plate 7 in the direction of the cassette, enable the magnetic heads 8 and 9 to be brought into operative contact with the magnetic tape, and which enable the magnetic tape to be pressed by a pressure roller 10 against a capstan 11 which extends perpendicularly to the head plate 7 and which is engageable with the drive of the apparatus.

The winding mandril 6 concentrically surrounds and engages with the end portion of a hollow spindle 12 (see FIG. 2), which is rotatable, about an axis of rotation 13, on a journal 13A which is rigidly mounted on the deck plate 4. At its end which is remote from the mandril 6 the spindle 12 is rigidly connected as a unit to a gear wheel 14, which during fast winding of the magnetic tape is directly coupled to the drive of the apparatus.

The spindle 12 together with the gear wheel 14 constitutes a first clutch section 15 which during recording or playback acts as the driven clutch section. In the embodiment shown the spindle 12 with the gear wheel 14 is made of a polyacetal plastic having the trade name "Delrin".

Figure 2:
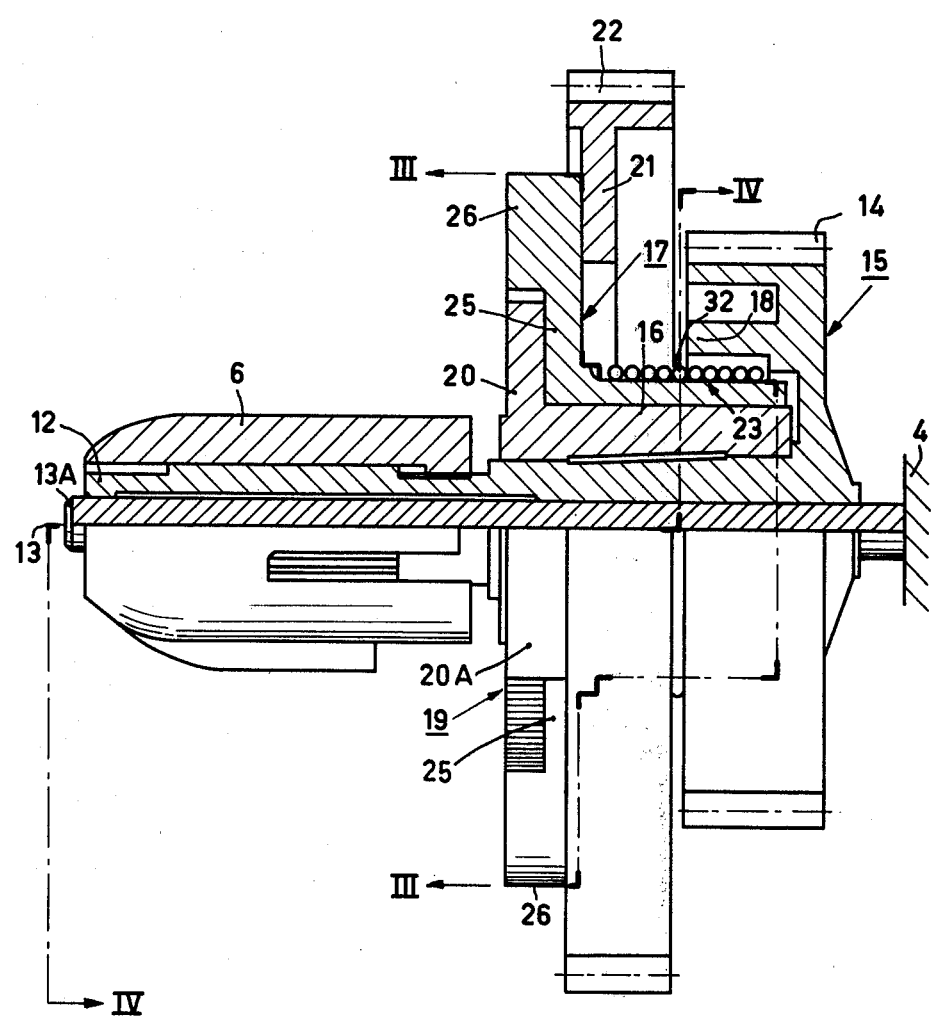
FIG. 2, partly in elevation and partly in an axial section taken on the line II—II in FIG. 1, shows a wrapped spring clutch in accordance with the invention on an enlarged scale.
Figure 3:
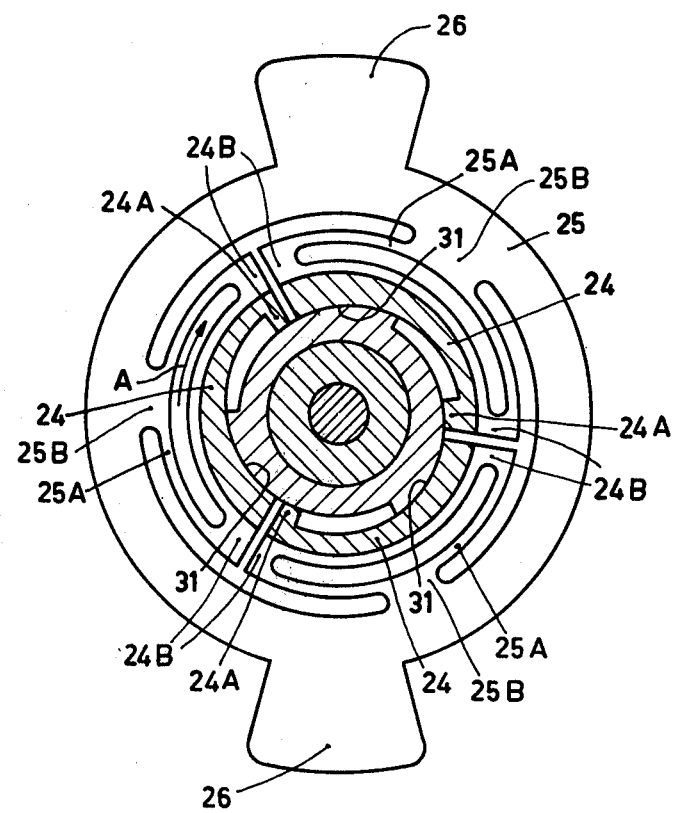
FIG. 3, partly in elevation and partly in a cross-section taken on the line III—III in FIG. 2, shows the outwardly spiralling ramps and the segments of the wrapped spring clutch.

The spindle 12 furthermore serves for journalling a cylindrical hub 16 of a second clutch section 17 which acts as drive clutch section during recording or playback. The hub 16 extends axially inside the gear wheel 14 and inside the gear wheel 14 it is surrounded by a ring 18 which is concentric with the hub and which is integral with the gear wheel 14. At its end which is remote from the gear wheel 14 the hub 16 is rigidly connected to a connecting element 19 comprising a flat annular portion 20 which extends perpendicularly to the axis of rotation 13. The element 19 further comprises a rim portion 20A, which is concentric with the axis 13 and adjoins the portion 20 (also see FIG. 4). The rim portion 20A is connected to an annular portion 21 of a gear wheel 22, which portion 21 is perpendicular to the axis of rotation 13. Said gear wheel 22 is rigidly connected to the hub 16 by the element 19 and viewed in FIG. 2, is situated at only a slight axial distance from the gear wheel 14. In the present embodiment the hub 16, the element 19 and the gear wheel 22 form a unit which is made of a polyamide plastic, known as "nylon". Engaged around the hub 16 is a substantially circular cylindrical sleeve 23, which comprises a plurality of separate segments 24 which have a similar arcuate shape in a cross-section perpendicular to the axis of rotation 13 and which, as is shown in FIG. 3, preferably each extend over an arc of substantially 120°. The segments 24 are made of an elastic material. In the present embodiment the polyacetal plastic with the trade name "Delrin" is used for the segments, which plastic has satisfactory antifriction properties and moreover is comparatively hard. The segments each extend in an axial direction into the space enclosed by the ring 18 and each are connected, as is shown in FIG. 3, at only two mutually spaced locations 24B to an intermediate ring 25A; the segments 24 are free at their other ends. In order to obtain an optimum movability for each segment in the radial direction each intermediate ring 25A, viewed in the circumferential direction, is connected only halfway at a location 25B to an annular support 25. One side of the support 25 is positioned against the flat annular portion 20. The support 25 is provided with adjusting means, constituted by two diametrically disposed adjusting members 26, which each extend in the radial direction beyond the circumference of the flat portion 20. For this purpose an arcuate recess 27 is formed in the portion 20 and the rim portion 20A for each member 26, which recess extends over an arc of approximately 120° in the present embodiment (see FIG. 4). In order to enable the respective members 26 to be fitted from the side nearer the gear wheel 14, openings 28 are formed in the portion 21, one such opening being formed adjacent one end of each recess 27, which openings, for the passage of the members 26, are shaped to suit the dimensions and shape of the members 26. At least one of the members 26 is provided with teeth 29 on the side which faces the flat portion 20, which teeth cooperate with teeth 30 on the arcuate wall of the recess 27.

Figure 4:
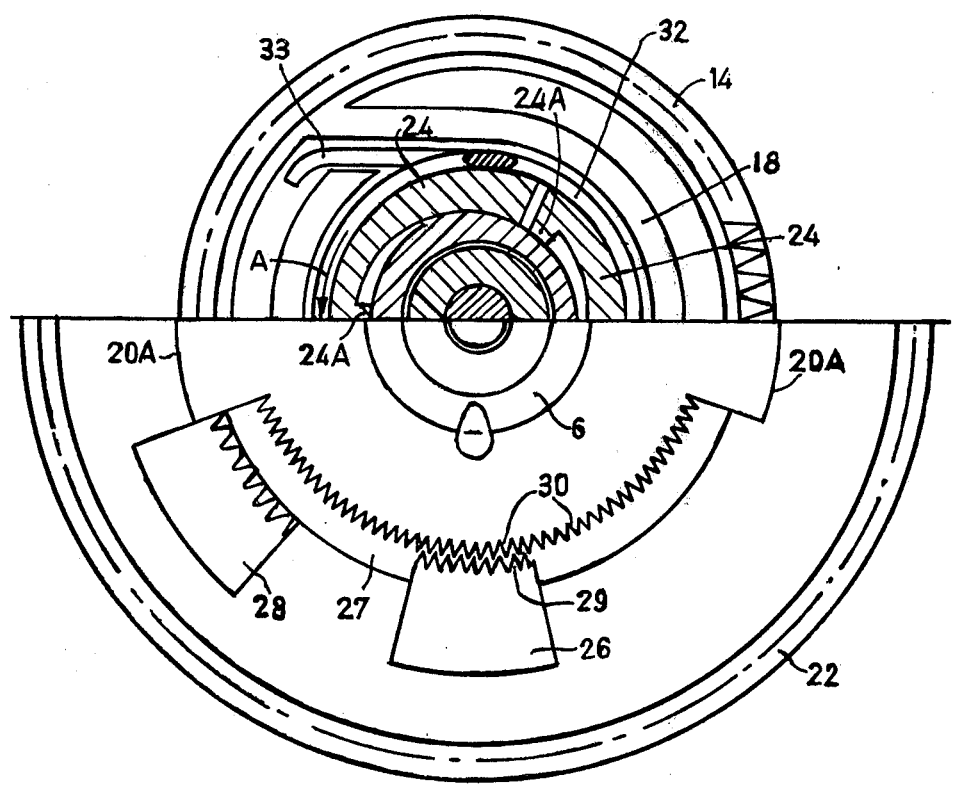
FIG. 4 partly in elevation and partly in a cross-section taken on the line IV—IV in FIG. 2, shows parts of the wrapped spring clutch.

The members 26 serve to enable the sleeve 23 by rotation around the hub 16, to be adjusted to and retained in any of a plurality of positions relative to the hub 16 (and thus relative to the other part of the clutch section 17). The adjustment is possible due to a loose contact between the teeth 29 and 30 (FIG. 4).

On its outer periphery the hub 16 comprises three similar convexly curved spiralling arcuate ramp surfaces 31 which each extend preferably over substantially 120°. Each surface 31 is formed so that, in a cross-section perpendicular to the axis of rotation 13 and reckoned in the direction of rotation A, the distance of the ramp surface from the axis of rotation 13 gradually increases (FIG. 4). The ramp surfaces act as cam surfaces to the diameter of the sleeve 23 upon the rotational adjustment of the sleeve around the hub 16. In order to obtain an accurate cooperation, the inner surfaces of the segments 24, on the inner circumference in a cross-section perpendicular to the axis of rotation 13, each have a concave arcuate shape which corresponds substantially to the ramp surfaces 31. Each segment, at that end of its arcuate inner surface which is further from the axis of rotation (i.e. the forward end relative to the direction of rotation represented by the arrow A) preferably comprises an inwardly radially extending shoulder 24A, whose distance from the axis of rotation 13 substantially corresponds to the distance from this axis of that end of the inner surface of the segment which is nearer the axis of rotation (the rearward end relative to the arrow A). The difference in radial distance between the two ends of the inner surface of each segment and the axis of rotation is approximately 0.4 mm in the present embodiment. However, depending on the required adjustment range this difference may have another value.

During rotation the segments 24 slide over the ramp surfaces 31. When the adjusting members 26 are situated adjacent the openings 28 in the initial position, each segment coincides fully with an associated one of the ramp surfaces, while the shoulder 24A of the segment is positioned against the beginning of the next ramp surface. As the members 26 are moved further in the direction of the arrow A an increasingly thicker part of each segment 24 slides over the part of the associated ramp surface which is furthest from the axis of rotation 13, as a result of which the segment is moved outwards in a radial direction and the sleeve diameter increases. As during the movement of the adjusting members 26 each shoulder 24A is also moved outwards in the radial direction by the next ramp surface, the cylindrical shape of the segments and therefore the cylindrical shape of the sleeve 23 is maintained during the adjustment. As stated, the segments are made of an elastic material and are moreover supported elastically with the aid of the intermediate rings 25A, so that when the members 26 are moved back in the opposite direction to the arrow A the segments move back and the sleeve diameter is reduced.

Wrapped around the sleeve 23 is a cylindrical helical torsion spring 32, a number of turns of which are accommodated in the space bounded by the sleeve 23 and the ring 18. An end portion 33 of the spring extends through an opening in the ring 18 and has a hooked extremity which is retained between the ring 18 and the gear wheel 14. Thus, the spring is connected to the first clutch section 15 with the end portion 33, at least in a tangential direction. The spring is wound in an anti-clockwise direction, i.e. in the direction indicated by the arrow A in FIG. 4. The end of the spring 32 which is remote from the end portion 33 is disposed freely. Thus, the spring is in contact with the second clutch section 17 via the spring turns only, all spring turns performing a similar function. In the present embodiment the spring is made of CrNi spring steel.

Together with the clutch sections 15 and 17 the spring 32 constitutes a wrapped spring slipping clutch. This clutch has the property that if the spring-wrapped clutch section 17 is driven in the direction of the arrow A via the gear wheel 22, which is generally the case during recording or playback, the spring 32, with respect to the winding direction, is slightly unwound by a torque which is transmitted by the friction between the spring turns and the sleeve 23 and whose magnitude depends on the instantaneous stress in the spring turns. The spring 32 in turn moves the driven clutching section 15, so that the winding mandril 6 is rotated and the magnetic tape is wound from the capstan 11.

If during winding the maximum transmissible torque is exceeded, slip will occur between the spring turns and the sleeve 23. Said maximum transmissible torque depends on the stress in the turns of the spring 32 which surround the sleeve, which stress depends on the diameter of the sleeve 23.

As stated previously, the diameter of the sleeve 23 can be changed by adjusting the members 26, a larger sleeve diameter resulting in a higher stress in the turns of the spring 32 and a higher maximum transmissible torque. In order to obtain a suitable lubrication of the sleeve 23, it may be advantageous, in addition to the use of a sleeve material which is suited to the function of the sleeve, to use silicone oil.

The wrapped spring clutch described in the foregoing enables the transmission torque to be adjusted simply, which adjustment can moreover be performed in a particularly accurate manner. The construction of the adjusting members 26 and the cooperating teeth 29 and 30 ensures that a specific adjustment of the clutch is always maintained.

In the case of a wrapped spring clutch which is employed in an apparatus of the type described such an adjustment may be necessary, because the components of the clutch, in particular the spring, exhibit tolerances which should be eliminated in order to obtain the most accurate tape transport.

Owing to its small axial dimension the present clutch may be used in an apparatus of the type described without any problems.

It is to be noted that the present clutch, in view of its unidirectional action through the use of the spring 32, also has the advantage that in the opposite direction, i.e. in the case of differences in relative speed between the gear wheels 14 and 22 in the direction opposite to the arrow A in FIG. 4, a free-wheel possibility is obtained. As a result of this several variants are possible for coupling the drive of the apparatus to the respective winding mandrils 5 and 6 and the capstan 11.

Furthermore, it is to be noted that, depending on the requirements imposed on the clutch, it is alternatively possible, instead of a sleeve 23 comprising separate segments 24, to employ a sleeve having a continuous cylindrical wall and made of a highly elastic material. Instead of three arcuate segments which extend over 120° each, it is alternatively possible to employ two or four or more segments, which together again cover 360°. The use of three segments represents an optimum situation in respect of the desired wide range of adjustment of the clutch and the retention of the circular cylindrical shape of the sleeve 23.

Because of the properties described above the wrapped spring clutch is also suitable for use in other equipment where it is necessary to correct certain tolerances and where a transmission with an accurately adjustable torque, in combination with a unidirectional action, is required.

What is claimed is:

1. An adjustable torsion-spring slipping clutch, comprising first and second coaxial clutch sections which are rotatable relative to each other about an axis of rotation, and a coaxially arranged cylindrical helical torsion spring which is connected at one end to the first clutch section, the second clutch section comprising a sleeve which is substantially circular in a cross-section perpendicular to the axis of rotation and around which turns of the spring are wrapped for transmitting torque between said clutch sections by the friction between the spring and sleeve, and means for adjusting the diameter of said turns to determine the torque to be transmitted between the clutch sections,
characterized in that the sleeve of the second clutch section has a substantially circular cylindrical shape and is adjustable in diameter.

2. A clutch as claimed in claim 1, characterized in that the sleeve is rotationally adjustable to any of a plurality of positions relative to another part of the second clutch section for adjusting the sleeve diameter.

3. A clutch as claimed in claim 2, characterized in that the sleeve comprises a plurality of similar segments which are arcuate in a cross-section perpendicular to the axis of rotation and which are each movable in a radial direction relative to the axis of rotation, and that the second clutch section further comprises an annular support having adjusting means for the rotational adjustment of the sleeve, said segments extending in an axial direction and being connected at one end to said annular support.

4. A clutch as claimed in claim 1 or claim 2, characterized in that the sleeve is made of a material which is elastically movable in a radial direction relative to the axis of rotation for adjusting the sleeve diameter.

5. A clutch as claimed in claim 4, characterized in that the sleeve comprises a plurality of similar segments which are arcuate in a cross-section perpendicular to the axis of rotation and which are each movable in a radial direction relative to the axis of rotation.

6. A clutch as claimed in claim 4, characterized in that the second clutch section comprises a substantially cylindrical hub, and that said sleeve is concentrically arranged around said hub, the hub at its periphery comprising a plurality of similarly convexly curved spiralling wrapped surfaces which cooperate with the sleeve, each wrapped surface, in a cross-section perpendicular to the axis of rotation, extending along an arc, the distance of the arc gradually increasing from the axis of rotation in a circumferential direction.

7. A clutch as claimed in claim 6, characterized in that the number of segments of the sleeve is equal to the number of wrapped surfaces of the hub, and that the inner surface of each segment, in a cross-section perpendicular to the axis of rotation, has a concave arcuate shape corresponding to the convex arcuate shape of the ramp surface.

8. A clutch as claimed in claim 7, characterized in that each segment, at that end of its arcuate inner surface is farther from the axis of rotation, comprises an inwardly radially extending shoulder, the distance of the shoulder from the axis of rotation substantially corresponding to the distance of that end of the inner surface of the segment, nearer the axis of rotation, to said axis.

9. A clutch as claimed in claim 7, characterized in that the ramp surface and the segments each extend over an arc of substantially 120°.

* * * * *

UNITED STATES PATENT AND TRADEMARK OFFICE
CERTIFICATE OF CORRECTION

PATENT NO. : 4,353,226
DATED : October 12, 1982
INVENTOR(S) : HENRICUS MARIA RUYTEN ET AL It is certified that error appears in the above—identified patent and that said Letters Patent is hereby corrected as shown below:

In the Title Page:

Under "Foreign Application Priority Data"

Change "792544" to —7902544—

Signed and Sealed this

Nineteenth Day of April 1983

[SEAL]

Attest:

Attesting Officer

GERALD J. MOSSINGHOFF

Commissioner of Patents and Trademarks